R. TEMPLE.
ROCK CUTTER.
APPLICATION FILED MAY 27, 1907.

1,002,786.

Patented Sept. 5, 1911.

Witnesses:
Inventor:
Robert Temple.
By Sheridan & Wilkinson
Attys.

UNITED STATES PATENT OFFICE.

ROBERT TEMPLE, OF DENVER, COLORADO, ASSIGNOR TO THE TEMPLE ENGINEERING COMPANY, OF DENVER, COLORADO, A CORPORATION OF COLORADO.

ROCK-CUTTER.

1,002,786.  Specification of Letters Patent.  Patented Sept. 5, 1911.

Application filed May 27, 1907. Serial No. 375,971.

*To all whom it may concern:*

Be it known that I, ROBERT TEMPLE, a citizen of the United States, residing in the city and county of Denver, State of Colorado, have invented certain new and useful Improvements in Rock-Cutters, of which the following is a specification.

My invention relates in general to mining machinery, and more particularly to rock cutters.

In the use of rock cutters, as, for instance, in making tunnels in mines, cutting edges become dull through contact with the rock or other material, so that the cutters must be frequently sharpened to maintain the desired efficiency.

The primary object of my invention is to provide a rock cutter, the cutters of which when dull may be readily detached from the supporting head and reformed to sharpen their cutting edges.

A further object of my invention is to provide a rock cutter comprising a plurality of separate cutters each having a plurality of cutting edges which may be successively presented to the work so that the cutters may be used a number of times before requiring reforming to replace the worn away edges.

The embodiment of my invention herein disclosed may be generally described as consisting of a cutter head having parallel series of elongated holes therethrough, clamping blocks having bolts extending through the holes in the series, cutters each having a plurality of cutting edges removably supported upon the head by the clamping blocks in parallel rows, the clamping blocks being interposed between the cutters in adjacent rows, whereby the cutters may be adjusted to successively present their cutting edges toward the work and may be detached from the head to be reformed when all of their cutting edges are worn.

My invention will be more fully described herein with reference to the accompanying drawings in which the same is illustrated as embodied in a convenient and practical form, and in which—

Figure 1:
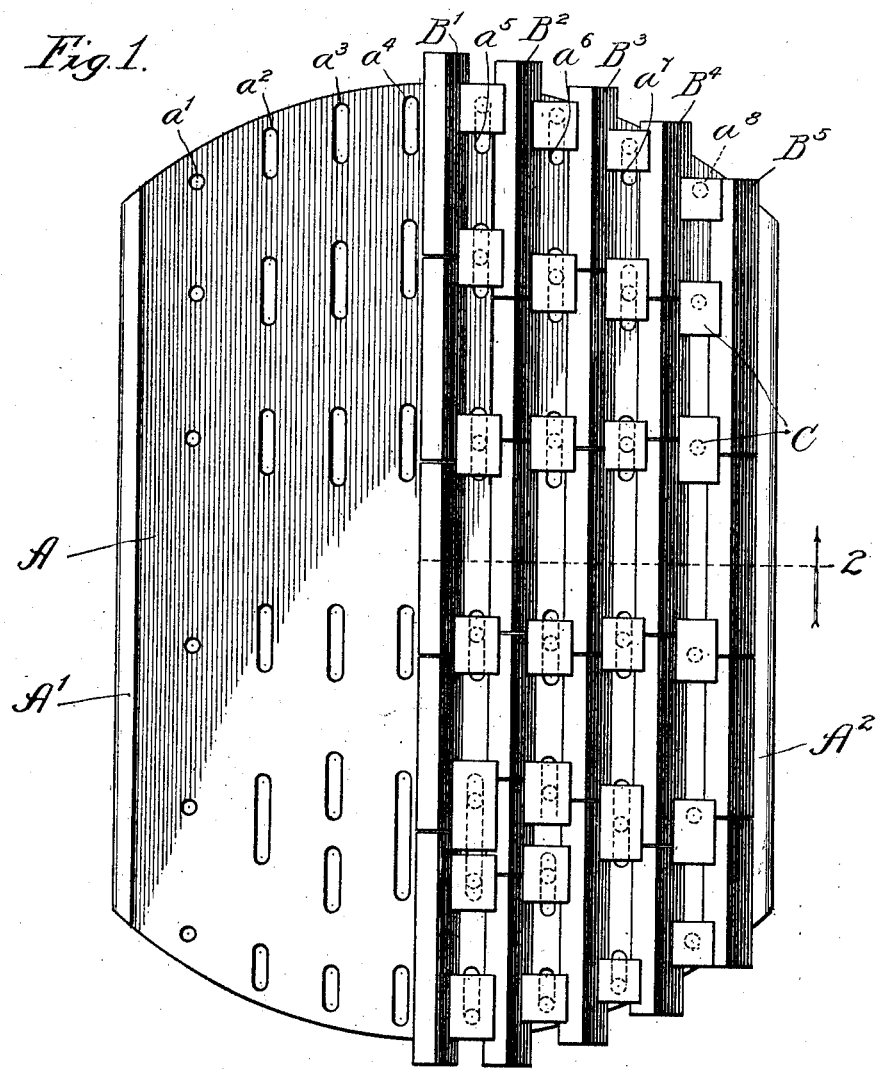
Figure 2:
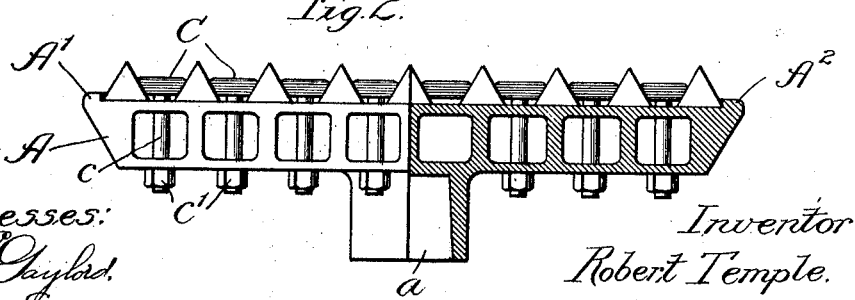

Figure 1 is a plan view, and Fig. 2 is in part an end elevational view and in part a transverse sectional view on line 2, Fig. 1.

Similar reference characters are used to designate similar parts in the several figures of the drawings.

Reference character A designates a head upon which rock cutters are supported, such head being provided with suitable means, as, for instance, a socket $a$ on the under surface thereof by means of which the head is secured to the end of a reciprocating bar. The head A is provided with parallel undercut flanges or ribs A′ and $A^2$ along the edges thereof at the sides of the surface upon which the cutters are supported. The ends of the head are preferably curved, as indicated in Fig. 1. The head A is preferably cored out, as shown in Fig. 2, thereby decreasing its weight without unduly reducing its strength. A plurality of parallel series of elongated holes extend through the head A, such series of holes being designated by reference characters $a'$ to $a^8$, inclusive. The adjacent series of holes are spaced equal distances apart while the series of holes $a'$ and $a^8$ are spaced inwardly from the side flanges A′ and $A^2$ a distance corresponding to the distance between the adjacent series of holes.

Supported upon the outer surface of the head A intermediate of the flanges A′ and $A^2$ and the adjacent series of holes $a'$, $a^8$, and intermediate of the adjacent series of holes, are cutters preferably provided with a plurality of cutting edges, such cutters being shown as triangular in cross section, thereby comprising three cutting edges.

B′ designates the central series of cutters which are supported between the rows of holes $a^4$ and $a^5$.

Located on opposite sides of the central series B′ of cutters are series such as indicated at $B^2$, while other series $B^3$ are located on opposite sides of the series $B^2$. Series of cutters $B^5$ are located along the sides of the head and engage the side flanges A′ and $A^2$, while series of cutters $B^4$ are located intermediate of the series $B^3$ and $B^5$.

In order that the cutters may be detachably secured to the supporting head A, clamping blocks C are provided having bolts $c$ secured thereto and extending through the elongated holes through the head. Nuts $c'$ engage the ends of the bolts $c$ which project through the head A. The clamping blocks C are of a shape to fit between the cutters in adjacent rows and when the cutters are triangular the clamping blocks are wedge shaped so as to securely clamp the cutters to the head.

The cutters are initially as long as can be practically made, and when new are preferably secured in the central row B' while the cutters which have been shortened in sharpening are located in the series on opposite sides of the middle series. When the edges of the cutters presented to the work become dull the clamps C are removed by disconnecting the nuts c' from the bolts c, whereupon the cutters are turned with respect to the head so that the sharp cutting edges are presented to the work. The cutters may in this manner be adjusted with respect to the supporting head so as to present successively the cutting edges to the work until all of the edges are dull, when it is necessary to reform the cutters to replace the worn away metal.

As the reforming of the cutters shortens them, it is necessary that the clamping blocks C should be adjusted with respect to the supporting head in order that the blocks may be so located with respect to the cutters as to clamp the cutters at opposite ends to the supporting head. Such adjustment of the clamping blocks is permitted by reason of the slots through which the bolts of the clamping blocks extend, being elongated. It is, therefore, evident that it is possible to reform the cutters a number of times before they become too short for their use.

By forming the supporting head with curved ends the lengths of the several rows of cutters varies, the row at the center being longest and the rows between the center row and the sides of the head being progressively shorter. It is, therefore, possible to utilize cutters of various lengths and still have the rows of cutters correspond approximately in length to the length of the supporting head.

From the foregoing description it will be observed that I have invented an improved rock cutting implement by means of which the cutters are capable of being used a long time, owing to their being provided with a plurality of cutting edges and also by reforming the cutters to replace the worn away edges.

While I have described more or less precisely the details of construction in which I have illustrated by invention as embodied, yet I do not wish to be understood as limiting myself to any particular form or shape of supporting head or cutters, as it is obvious that my invention is capable of being embodied in various specific forms.

Having now fully described my invention, what I claim and desire to secure by Letters Patent, is—

1. In a rock cutter, the combination with a supporting head, of a plurality of parallel unequal rows of cutters of different lengths, clamps intermediate of the rows of cutters for detachably securing the cutters to said head, and means for adjustably securing said clamps to said head.

2. In a rock cutter, the combination with a supporting head, of a plurality of independent rows of separate cutters, the cutters in each row being arranged end to end, and means intermediate of the adjacent rows for simultaneously engaging and thereby detachably securing the cutters in adjacent rows to the head.

3. In a rock cutter, the combination with a supporting head, of a series of cutters each having a plurality of cutting edges, clamps for removably securing the cutters to the head so that the cutting edges may be successively presented to the work, and means for adjustably securing said clamps to said head.

4. In a rock cutter, the combination with a supporting head, of a series of triangular cutters, clamps for detachably securing said cutters to said head so that the cutters may be adjusted to successively present their cutting edges to the work, and means for adjustably securing said clamps to said head.

5. In a rock cutter, the combination with a supporting head, of a plurality of independent rows of separate cutters, clamps interposed between and simultaneously engaging the cutters in adjacent rows, and means for detachably securing said clamps to the head.

6. In a rock cutter, the combination with a supporting head, of a plurality of parallel independent rows of separate cutters, the cutters in each row being arranged end to end, clamping blocks interposed between and simultaneously engaging the cutters in adjacent rows, and means for detachably securing the clamping blocks to said head.

7. In a rock cutter, the combination with a supporting head having a plurality of parallel rows of elongated holes therethrough, of a plurality of cutters arranged in rows upon said head intermediate of the rows of holes therethrough, clamping blocks movably interposed between the adjacent rows of cutters, bolts secured to said clamping blocks and extending through the holes in said head, and fastening devices engaging said bolts for retaining the clamping blocks in position to secure the cutters to said head.

ROBERT TEMPLE.

Witnesses:
GEO. L. WILKINSON,
W. T. JONES.